Feb. 25, 1947. H. R. SHAMPAINE 2,416,410
OPERATING AND EXAMINING TABLE
Filed Feb. 22, 1943 9 Sheets-Sheet 1

INVENTOR.
HYMAN ROBERT SHAMPAINE
BY
ATTORNEY

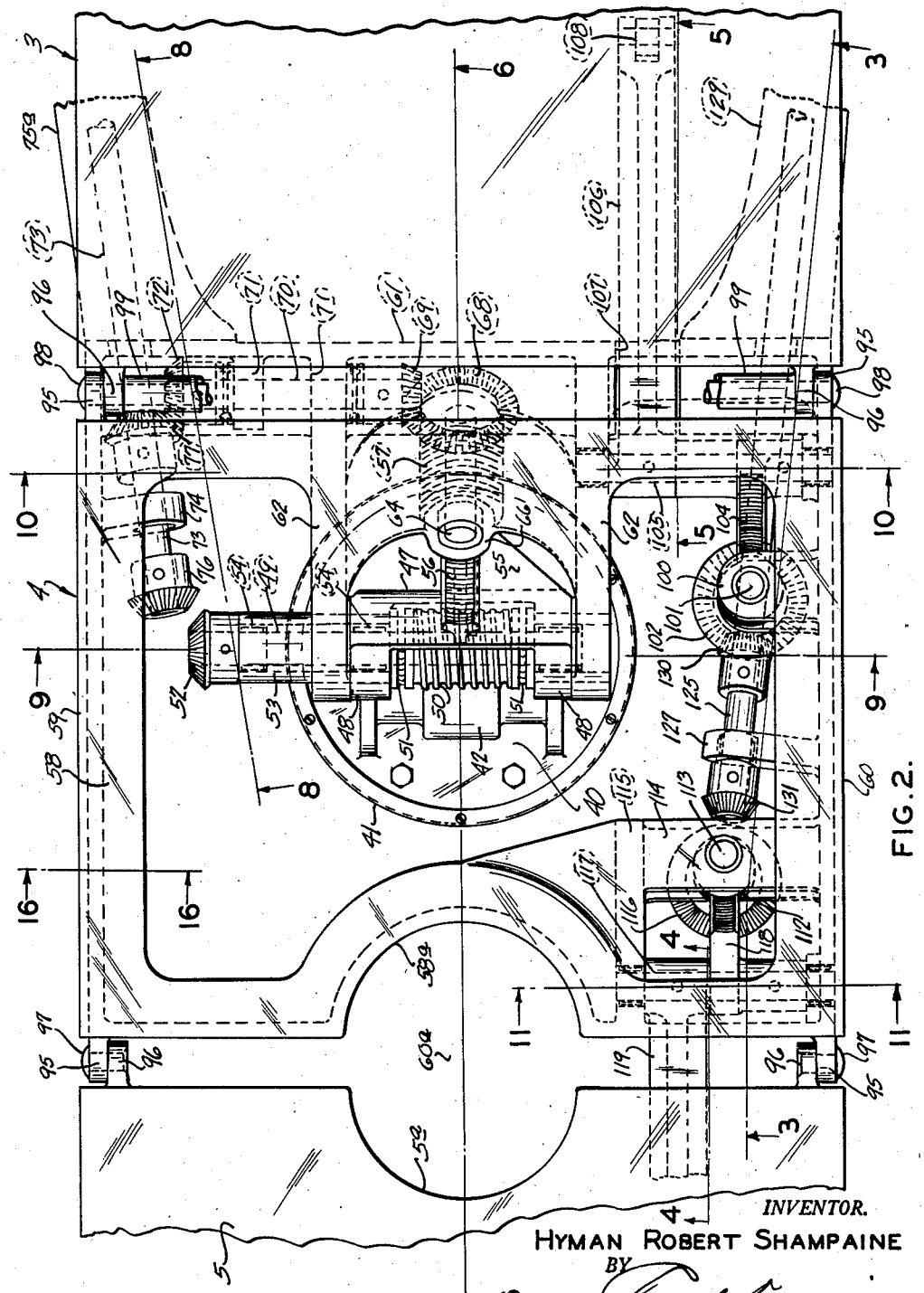

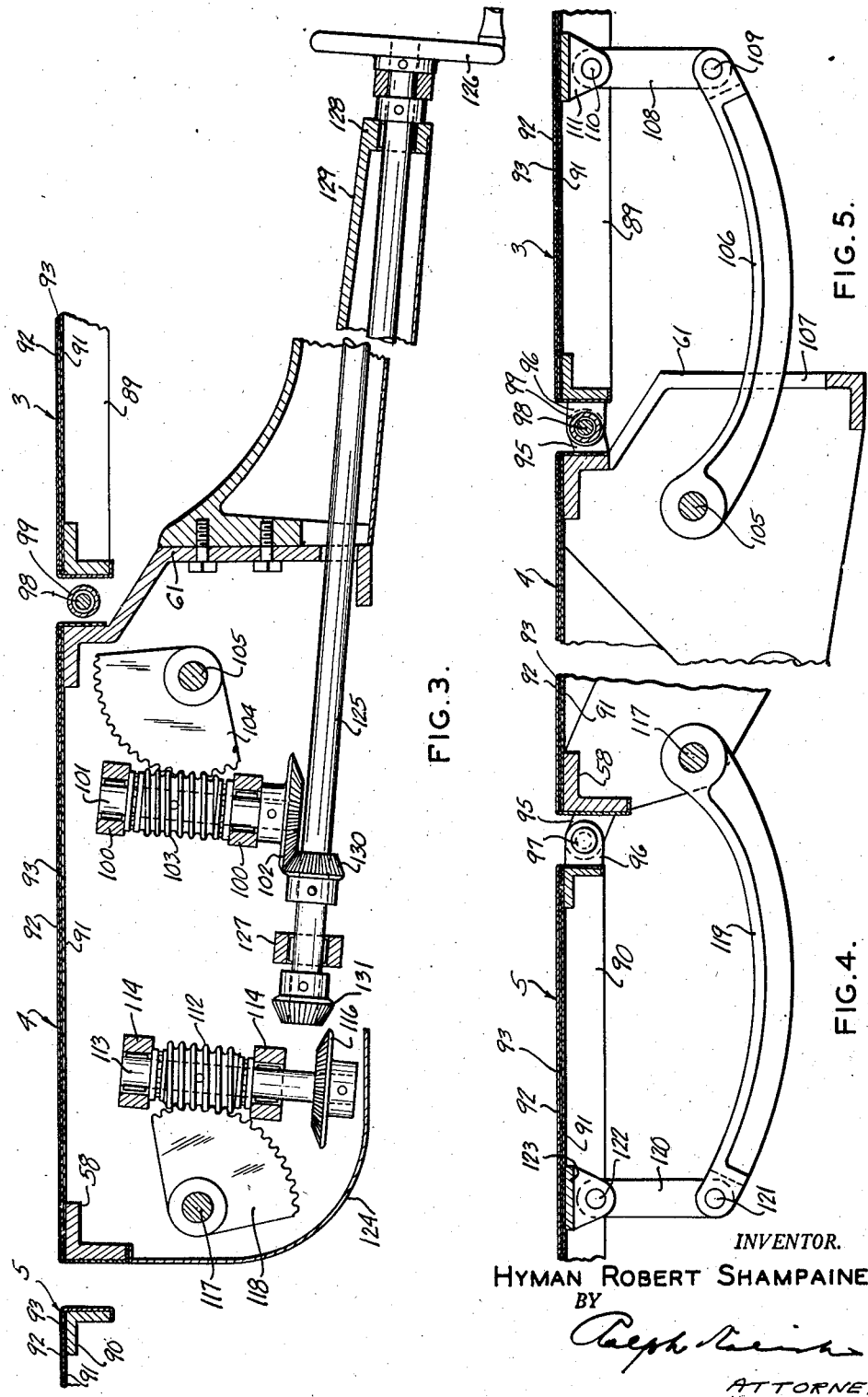

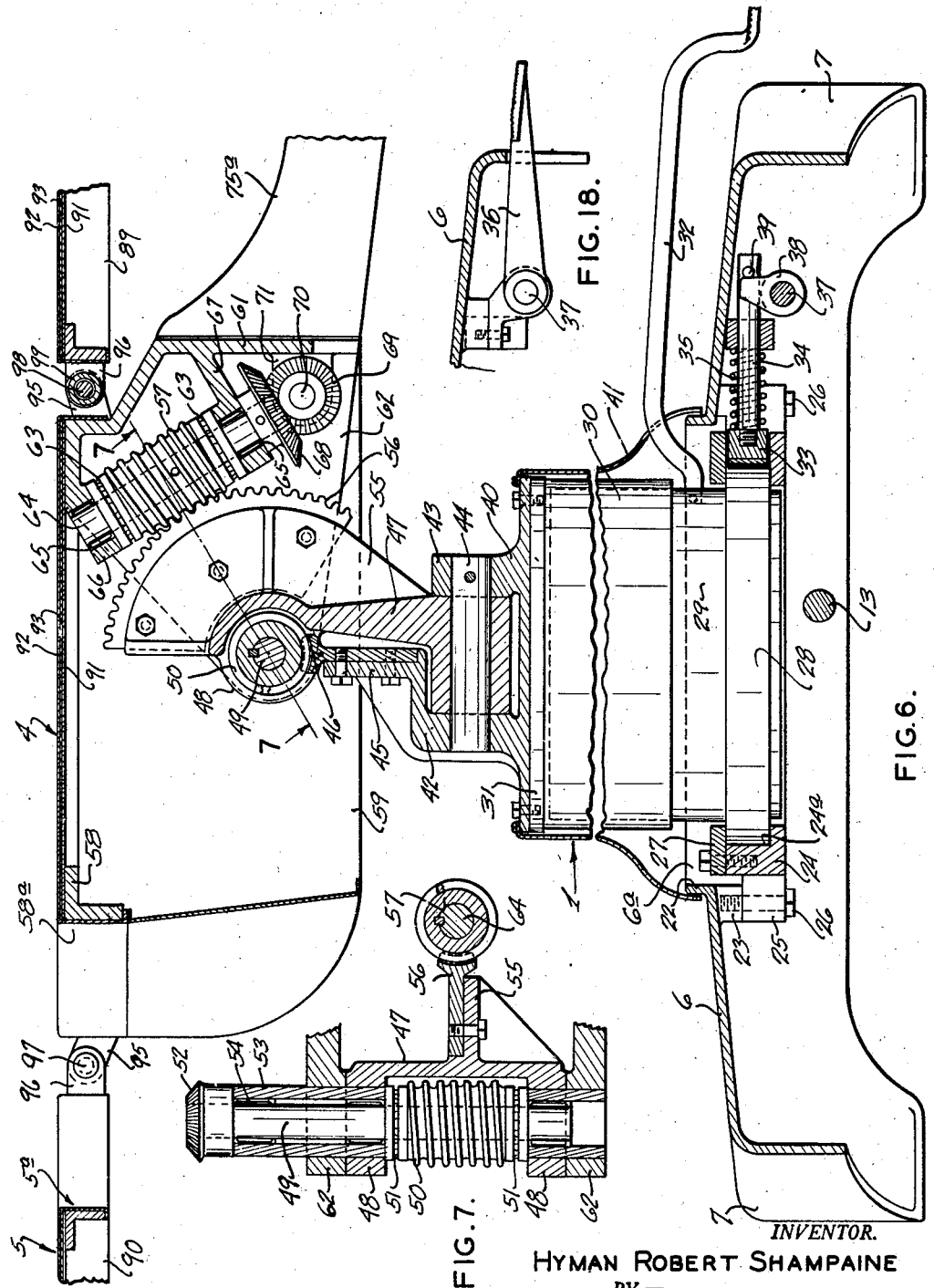

INVENTOR.
HYMAN ROBERT SHAMPAINE

ATTORNEY

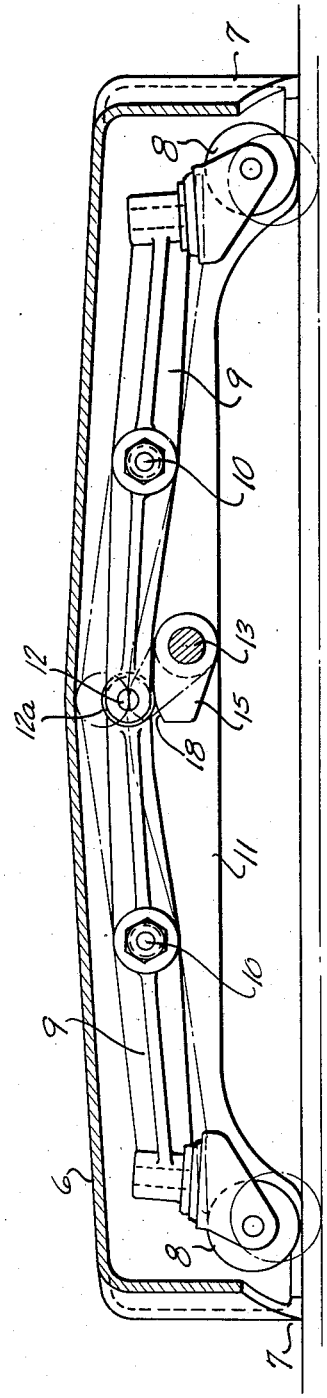
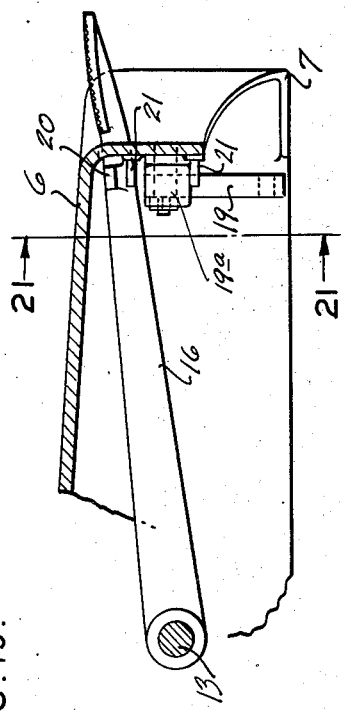
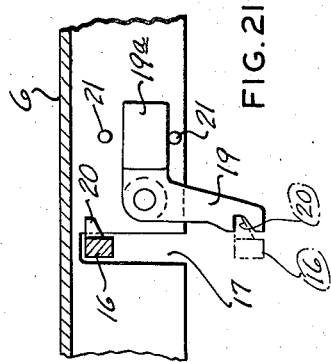

Patented Feb. 25, 1947

2,416,410

UNITED STATES PATENT OFFICE 2,416,410

OPERATING AND EXAMINING TABLE

Hyman Robert Shampaine, Clayton, Mo., assignor to Leah Ree Shampaine, Clayton, Mo.

Application February 22, 1943, Serial No. 476,699

7 Claims. (Cl. 311—7)

This invention relates generally to surgical apparatus and, more particularly, to a certain new and useful improvement in surgical apparatus of the type commonly known as operating or examining tables.

The invention has for its principal object the provision of an operating table having an articulated top which, as a unit, may be laterally and longitudinally tilted by the action of a single shaft.

More specifically, the present invention has for an object the provision of a table of the character mentioned uniquely constructed for simplifying and reducing the number of controls heretofore requiring separate and independent manipulation, to the end of facilitating the work of the anesthetist, technician, or other operator in adjusting the top-sections to meet the requirements of the particular operation or examination.

The invention has for another object the provision in a table of the type described of an arrangement whereby all of the controls for the respective top-sections are within easy and convenient reach of an operator seated at the head-end of the table, and such that all adjustments may be made by so-called touch control, without visual observation of dials or complicated levers which might distract the attention during critical moments of an operation or examination.

Another object of the invention is the provision in the table of improved, compact operating mechanism, which is especially well adapted for enclosure in a housing of relatively small dimensions.

These and other objects and advantages of the invention will be fully explained in the following description of a preferred embodiment of my invention, reference being made to the accompanying drawings forming a part thereof, wherein—

Figure 2 is a top plan view principally of the center or lower body section of the table, with the upper surface panel thereof removed to reveal the operating mechanism;

Figure 3 is an enlarged sectional view taken approximately on the line 3—3, Figure 2, showing some of the mechanism for effecting angular adjustments of the back-rest and leg-sections of the table;

Figure 4 is an enlarged sectional view taken approximately on the line 4—4, Figure 2, showing adjustment linkage for the leg-section;

Figure 5 is an enlarged sectional view taken approximately on the line 5—5, Figure 2, showing adjustment linkage for the back-rest section;

Figure 6 is an enlarged sectional view taken approximately on the line 6—6, Figure 2, showing generally the mechanism for obtaining height adjustment and the gearing for effecting angular adjustment of the center-section and lateral tilt of the entire table-top;

Figure 7 is an enlarged detail sectional plan view taken approximately on the line 7—7, Figure 6;

Figure 18 (sheet 4) is a detail section taken on the line 18—18, Figure 17, showing the pedal for releasing the table-top for rotary actuation;

Figure 19 is a detail section taken on the line

Figure 17:
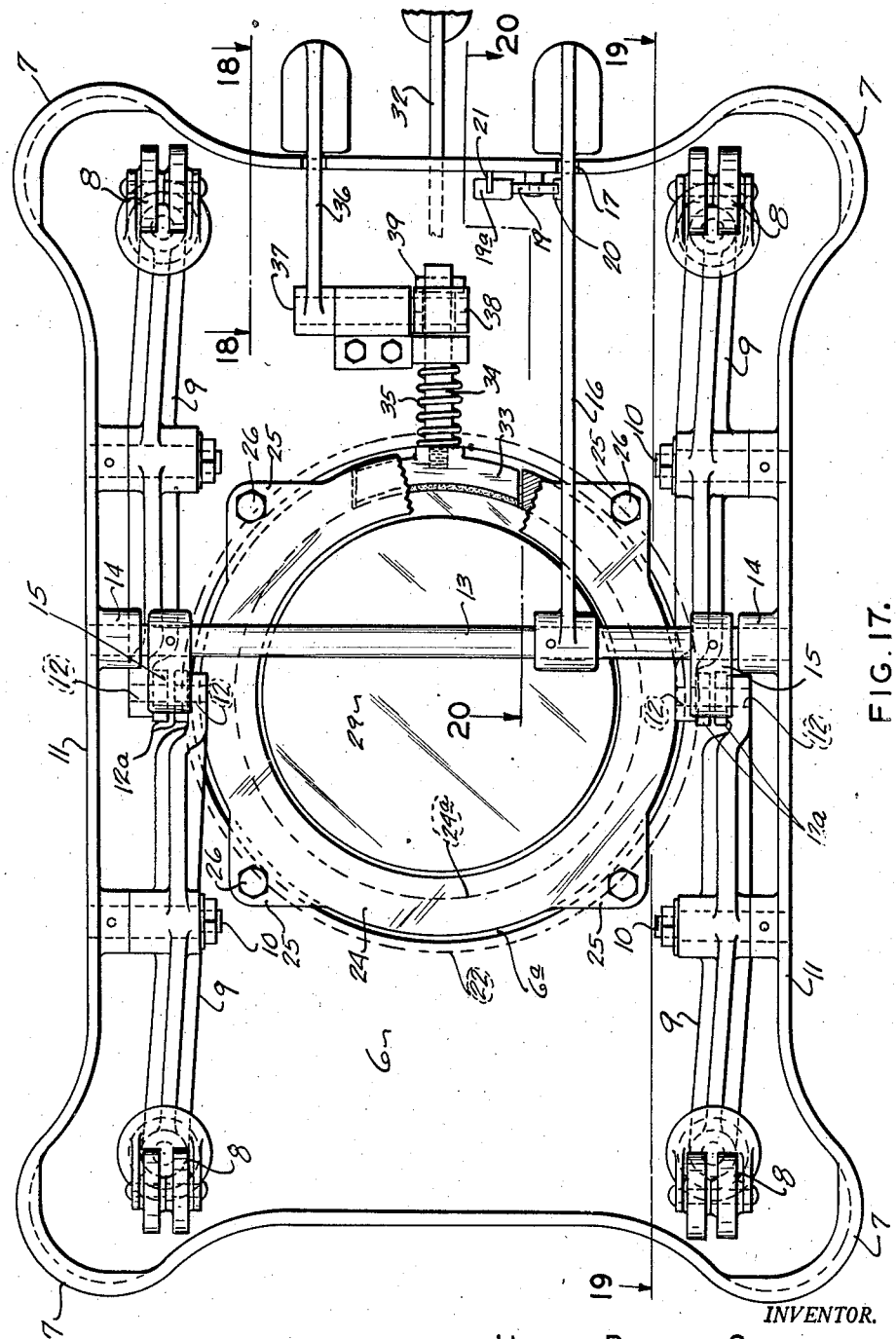
Figure 17 is a bottom plan view of the base structure of the table.

19—19, Figure 17, showing the means for adjusting and controlling the base casters;

Figure 20 is a detail section taken on the line 20—20, Figure 17, showing the caster control pedal; and Figure 21 is a transverse section taken on the line 21—21, Figure 17, showing the locking means for the caster control pedal.

Figure 1:
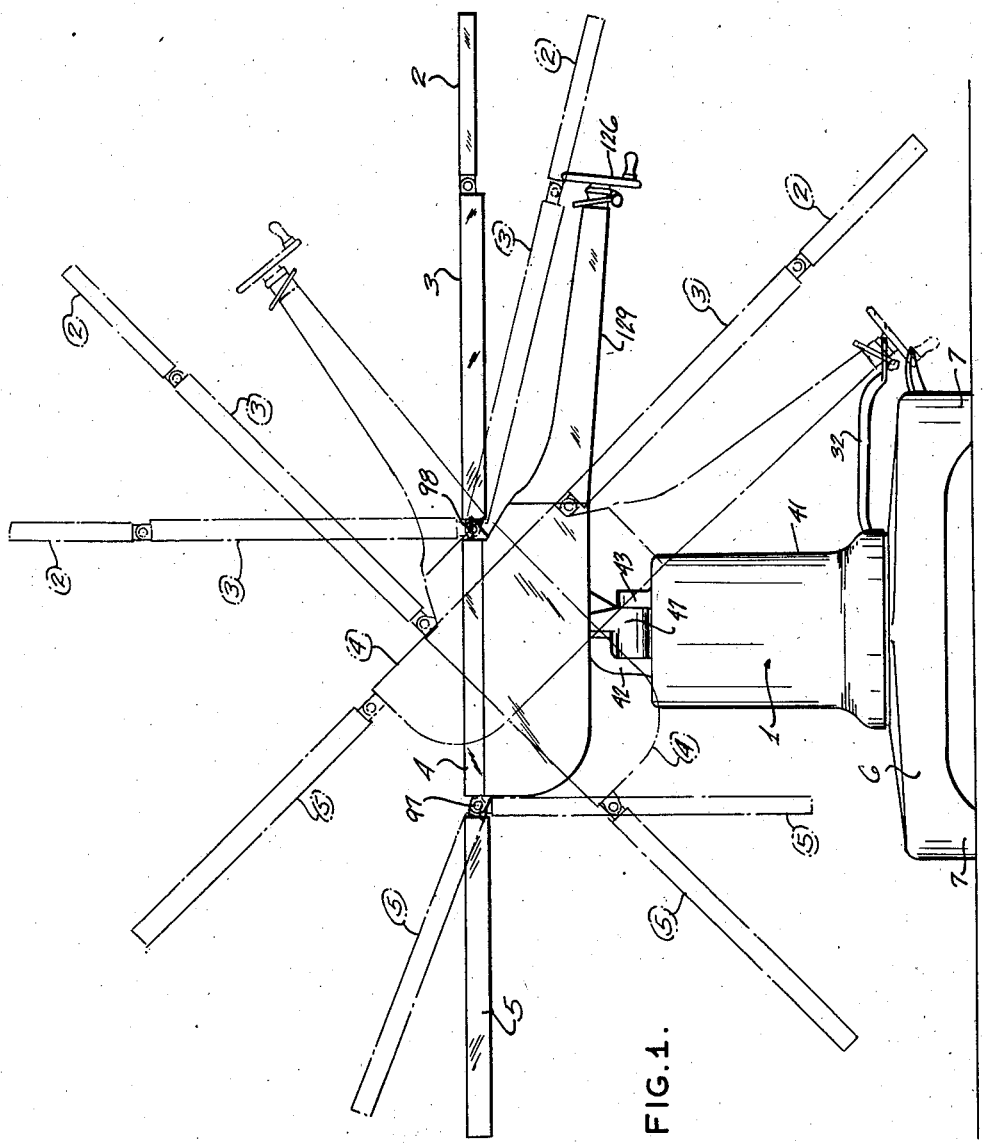
Figure 1 is an elevational view of the table with its top-sections in full and dot-dash lines in various positions of adjustment.

Referring now more in detail and by reference characters to the drawings, the operating table, as best appears in Figure 1, comprises generally a pedestal 1 and a jointed or articulated top, which latter, in the present instance, consists of four individually adjustable sections, namely, a headrest 2, back-rest 3, lower body or seat section 4, and leg-rest section 5. In addition to such top sections, but not specifically here shown, there is preferably provided a foot-rest formed as a hinged extension of the leg-rest 5, and a body elevator or kidney bridge which forms a part of the lower body section 4 adjacent the back-rest 3.

The pedestal 1 includes a hollow, generally rectangular base-member 6 having leg formations 7 at the four corners thereof, and, as appears in Figures 17 and 19, concealed within each leg formation 7, is a caster assembly 8 mounted on the outer end of a lever 9 individual thereto.

The several levers 9 terminate, as shown, inwardly approximately at the transverse center line of the table and are fulcrumed intermediate their length on respective fixed bearing-studs 10 that project inwardly from the skirt-portion 11, of the base-member 6, the levers 9 being each provided at its inner end with a pin 12 supporting for rotation a roller 12$^a$.

Extending transversely within the base 6 below the levers 9, is a shaft 13 centrally off-set toward the forward or control end of the base 6 and having its ends journalled in bearing studs 14 preferably integrally formed on the base skirt-portion 11. A pair of somewhat angular rocker-arms 15 are suitably fixed to, and so located on, shaft 13 as to each have its free end underlie the rollers 12$^a$ of a pair of the levers 9. A pedal 16 also secured at an end to shaft 13 extends rearwardly of the table through a suitable opening 17 in the base-skirt 11, where it is conveniently accessible to an operator seated at the control or so-called head-end of the table.

Under normal conditions of use, the base 6 rests solidly and firmly on a floor or other support, the casters 8 and likewise the pedal 16 being disposed in relatively elevated positions. When it is desired to bodily move the table, the pedal 16 is depressed, thereby causing rounded camming noses 18, best seen in Figure 19, of rocker-arms 15 to force the roller equipped ends of levers 9 upwardly to a position against the under surface of the base 6 and the outer end-portions of the levers 9 downwardly for engaging the casters 8 with the floor or other support and accordingly elevating or raising the base 6 from the floor, so that the table may be bodily conveniently rolled on the casters 8.

Means for locking the casters 8 in their table supporting or floor engaging position is shown in Figures 20 and 21 and desirably comprises a pivoted detent 19 having a notched end-portion for receiving a projection 20 on the pedal 16, an arm 19$^a$ extending laterally from the detent 19 serving as a counterweight for maintaining the latch or detent 19 in position automatically to lock the depressed pedal 16 and further serving to limit movement of the detent 19 by its abutment with stop-projections 21. It will be understood, of course, that, on quick depression of the pedal 16, its projection 20 will be released from engagement with the detent 19.

As best seen in Figure 6, the base-member 6 has an approximately central annular opening, as at 6$^a$, and at said opening is provided with a short upstanding peripheral flange 22 and a series of spaced, depending lugs 23. 24 designates a ring having lateral lugs 25 appropriately spaced to mate with the lugs 23, to which they are secured as by bolts 26, and a rabbet, as at 24$^a$, formed in the inner circumferential face of the ring 24, together with a separable overlying ring 27, provide an annular seat and journal for a bearing shoulder 28 on the lower end of a pedestal or column member 29, which constitutes the piston of hydraulically operable means for adjusting the height of the table-top and snugly fits the bore of a coating cylinder member 30, which is closed at its upper end as by an end-plate 31.

It may be here remarked that a suitable pump (not shown) concealed within the pedestal 29 is arranged for actuation as by a pedal 32, which extends to the operating end of the base 6 at one side of the caster control pedal 16 and serves, in the well known manner, to force suitable fluid into the cylinder-space and thereby elevate the cylinder and table-top mounted thereon, the outflow of fluid from the cylinder to lower the table-top being controlled by a suitable valve (not shown) also operated by pedal 32, as will be well understood.

The pedestal or column 29 and the table-top which it supports, being journalled in the base 6 by the companion ring-member 24 and annular shoulder 28, is rotatable about the vertical axis of the piston-cylinder assembly. Normally, rotation of the table-top is prevented by a locking mechanism also shown in Figure 6 and which comprises a suitable brake-shoe 33 mounted on the inner end of a plunger-rod 34 and urged or biased into frictional engagement with the bearing-shoulder 28 by a spring 35. Outward displacement or retraction of the brake-shoe 33 to release the column 29 for rotation is effected by means of a pedal 36 fixed to a shaft 37, on which a rocker arm 38 is secured and arranged for engagement with a lateral projection 39 on plunger rod 34. It should be understood that, to render the locking device entirely effective, relative rotation of the piston and cylinder members of the pedestal is prevented by suitable co-operative means thereon, as, while not here shown, key and key-way provisions, for example; and it will be observed by reference to Figure 17 that the control pedal 36 has its tread portion disposed adjacent the treads of pedals 16 and 32 at the rear or head-end of the table, where all such pedals are within easy, convenient reach of the operator or technician.

Figure 9:
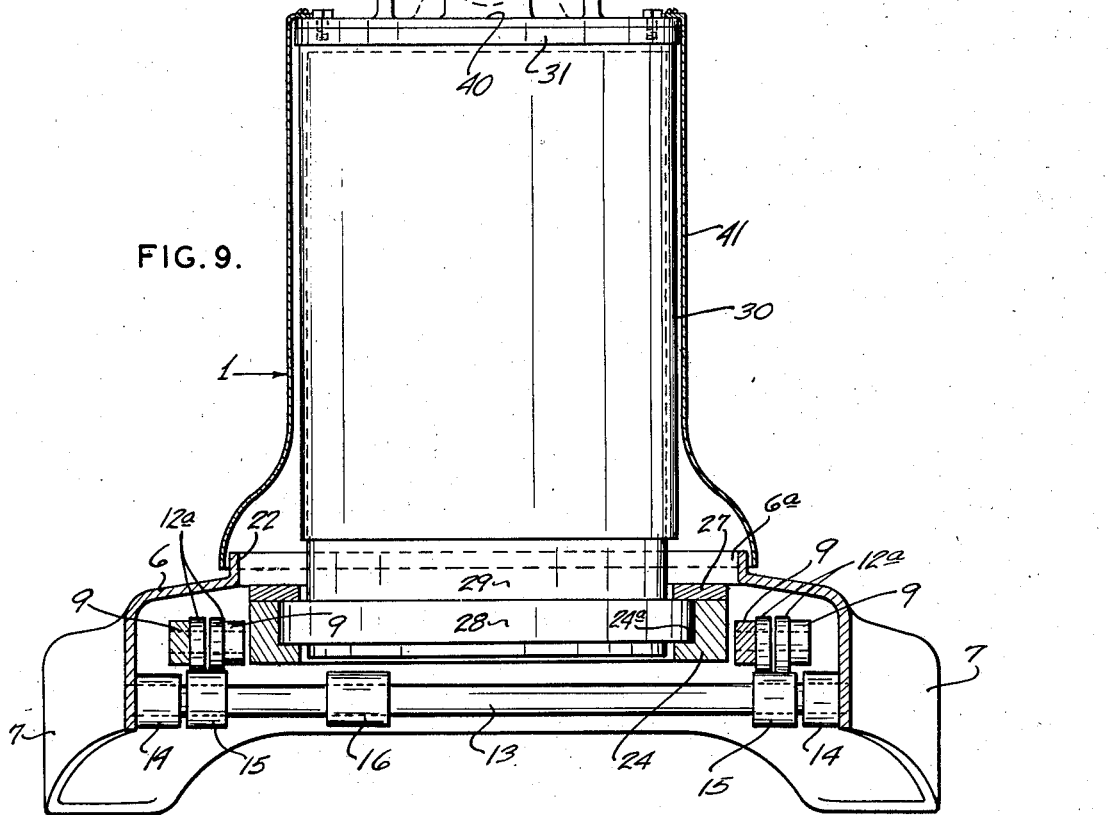
Figure 9 is an enlarged sectional view of the table taken approximately on the line 9—9, Figure 2, chiefly illustrating the means for obtaining height adjustment and lateral tilt of the table top.

Turning now to the table-top surmounting the pedestal-cylinder 30 and suitably bolted to the end-plate 31, as also shown in Figures 6 and 9, is a trunnion-member 40, to which is secured the upper end of a depending annular apron 41 that provides a housing for the column 29.

The trunnion-member 40 has a pair of upstanding bearing arms 42 and 43, in which are received the ends of a horizontal axle-shaft 44 for supporting the table-top and pivotally enabling lateral tilting thereof.

Bearing arm 42 is provided with an inwardly off-set extension 45, to which is bolted a sectorshaped worm gear 46, disposed in a vertical plane axially of the pedestal column 29.

A stanchion or coupler member 47 is journalled at its lower end on the axle-shaft 44, so as to permit of lateral tilting thereof, and formed on one side of the member 47 and located above the gear sector 46, is a pair of bearing-bosses 48, in which is journalled a transverse shaft 49, keyed on which and meshing with gear-sector 46, is a table-top lateral tilting worm 50 preferably provided at its ends with thrust bearings 51, as best seen in Figures 2 and 9, and adapted to be rotated by means of a bevel gear 52 in conjunction with other gearing presently described, gear 52 being fixed on a projecting end-portion of a shaft 49 at a point near one side of the table-top. As further seen in Figure 9, a sleeve 53 encloses the intermediate portion of shaft 49 and has installed therein suitable anti-friction shaft bearings 54.

As best appears in Figure 6, there is formed on the stanchion member 47, on the side thereof opposite the worm 50, a longitudinally projecting flange 55, to which is fixed a worm gear sector 56, meshing with which is a worm 57 carried by the center section 4 of the table-top, such worm and gear assembly, with other agencies presently described, enabling angular adjustment of the table-top in a longitudinal plane.

As best seen in Figures 2, 6, 8, 9, and 10, the center section 4 of the table-top has a frame structure 58, the members of which are preferably angulate in cross-section, and formed integrally with the side members of the frame 58, are depending rigid side panels 59 and 60 that serve to support and shield the control mechanism. The posterior end-portion of frame 58 is formed to provide a semi-circular recess, as at 58ª, which, together with a complementary recess, as at 5ª, in the adjacent end of the leg-rest section 5, provide an unobstructed access opening 60ª, especially useful in perineal surgery. At the opposite or anterior end of frame-portion 58, is a preferably integrally formed depending plate 61, from which project a pair of bearing arms 62 whose ends are journalled on shaft 49 for pivotally supporting the center-section 4, which, in turn, as presently fully appears, supports the other sections of the table-top.

The worm 57, together with its thrust bearings 63, are mounted on an obliquely disposed shaft 64 supported by anti-friction bearings 65 in arms 66 and 67 formed, respectively, on the frame-portion 58 and end-plate 61, as best seen in Figures 6 and 9, and fixed to the lower end of shaft 64, is a bevel gear 68, which meshes with a companion gear 69 secured to the end of a transverse shaft 70 supported by bearing arms 71 formed on the end-plate 61 and extending toward the right-hand side of the table for mounting a beveled driving gear 72.

Figure 8:
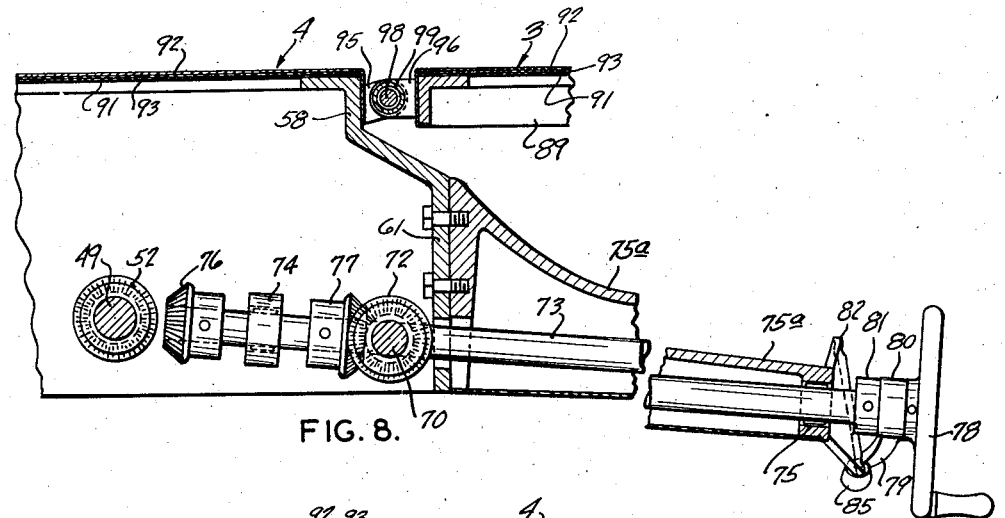
Figure 8 is an enlarged sectional elevation taken approximately on the line 8—8, Figure 2, showing the adjusting and control means for the top center-section and lateral tilt of the table top.
Figure 10:
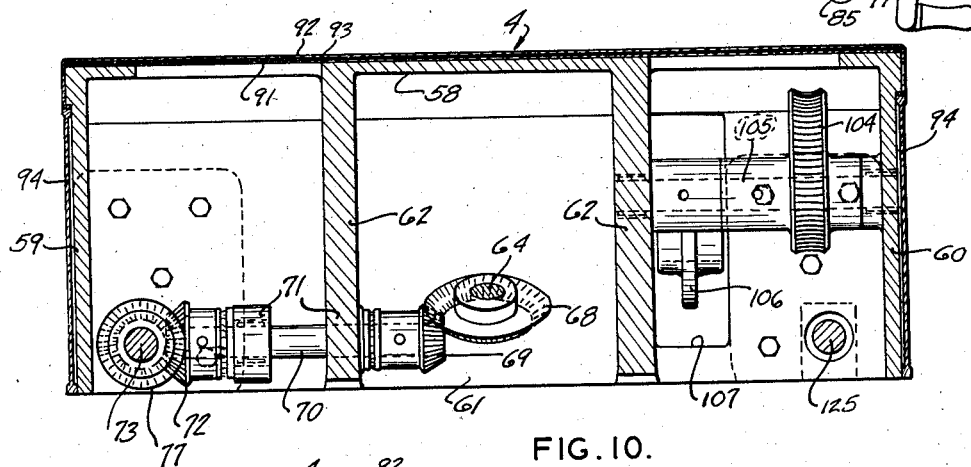
Figure 10 is an enlarged sectional view of the table taken approximately on the line 10—10, Figure 2, showing portions of the gearing for effecting angular adjustment of the center and back-rest sections.
Figure 11:
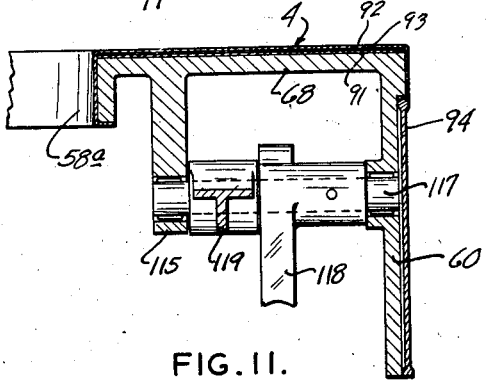
Figure 11 is an enlarged sectional view of the table taken approximately on the line 11—11, Figure 2, further illustrating gearing for adjusting the leg-rest.

The table, as will be seen, includes a unified control for its top adjustments, namely, those for effecting lateral and longitudinal tilt, and such control, in part, comprises a shaft 73 that extends below and along the right-hand side of the table-top from approximately the center to its head-end and, as best appears in Figures 2 and 8, is journalled for rotatory and endwise movement by a pair of suitably spaced bearing-arms 74, 75, the former being located near the rear end of the shaft and projecting from the side panel 59 and the latter being disposed at the front end of a shaft-housing 75ª rigidly secured at its opposite end to the end-plate 61 of the table-top center-section, as seen in Figure 8.

Shaft 73 is adapted for endwise, as well as rotary, movement, as has been mentioned, and fixed to and upon its rear end, is a bevel gear 76 for meshing engagement with bevel gear 52 when shaft 73 is axially displaced or shifted rearwardly or inwardly.

A second bevel gear 77 is appropriately positioned on, and fixed to, shaft 73, as also seen in Figures 2 and 8, so that, when shaft 73 is drawn outwardly, such gear 77 will mesh with gear 72, the gears 52 and 76 at the same time becoming mutually disengaged.

Figure 12:
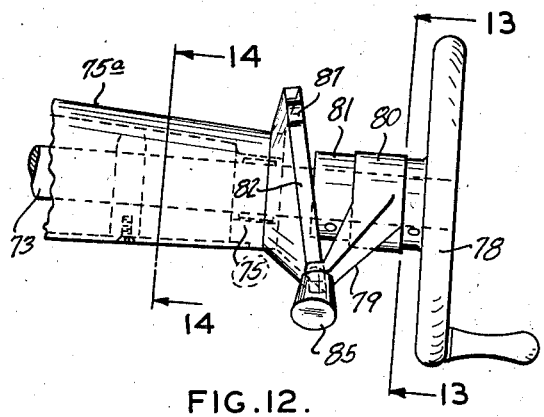
Figure 12 is an enlarged fragmentary side view of some of the gear shift mechanism for obtaining selective adjustments of top sections by a single control agency.
Figure 13:
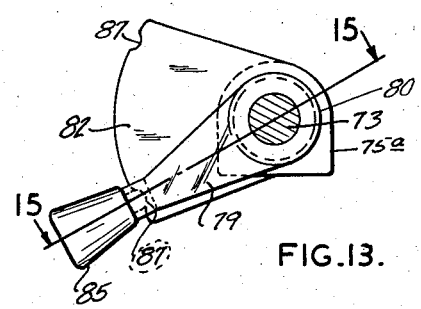
Figure 13 is a vertical section of the gear shift control taken approximately on the line 13—13, Figure 12.

Rotation of shaft 73 is preferably manually effected by means of a hand-wheel 78 located on its forward extremity, and axial shifting movement of shaft 73 is accomplished by means of a lever 79 located immediately behind wheel 78, as seen in Figures 8 and 12, so that lever 79 may be manipulated without necessitating removal of the hand of the technician from the wheel 78.

Figure 15:
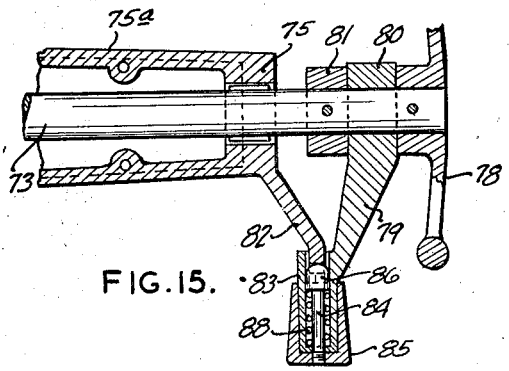
Figure 15 is a sectional plan view of the gear shift control taken approximately on the line 15—15, Figure 13.
Figure 14:
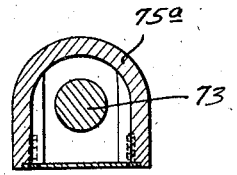
Figure 14 is a transverse section of the gear control shaft taken approximately on the line 14—14, Figure 12, showing the shaft housing and bearings.
Figure 16:
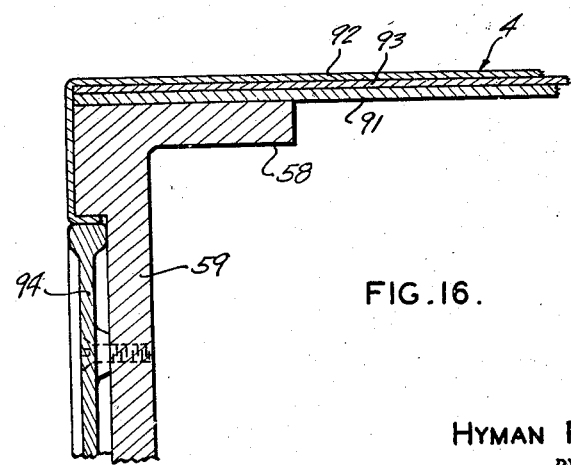
Figure 16 is an enlarged transverse section taken approximately on the line 16—16, Figure 2, showing certain construction features of the top center-section.

As clearly appears in Figures 12 and 15, the hub-portion 80 of levers 79 is journalled on shaft 73, so that rotary actuation thereof will not be imparted to the lever 79, yet the hub-portion 80 is confined between the hand-wheel 78 and a fixed collar 81, so that inward or outward lateral displacement of the lever 79 will be transmitted to the shaft 73. Such displacement or shifting of the lever 79 is conveniently accomplished as a concomitant to its swinging movement by means of a guide or sector-flange 82 formed on or otherwise suitably secured to the end of the shaft housing 75ª and having an arcuate periphery disposed in a plane oblique to the axis of shaft 73, lever 79 being provided with an offset extension 83 grooved at its inner end to receive and closely fit about the peripheral margin of flange 82. Consequently, lever 79, when swung from one to the other of its extreme positions, is caused to travel in a fore and aft direction, thereby selectively meshing gear 76 with gear 52 or gear 77 with gear 72 and enabling the operator or technician to readily control through the hand-wheel 78 desired longitudinal and lateral tilt of the table-top.

As further seen in Figure 15, the lever extension 83 is bored longitudinally to accommodate a plunger 84 threaded to a handle-element or knob 85 and adapted at its inner or head-end 86 to seat in either of two rounded or arcuate depressions 87 in the flange 82 for retaining the lever 79 in either of its operating positions. A spring 88 coiled about the plunger 84 and abutting the head 86 and the base of extension 83 applies sufficient inward biasing force to the plunger 84 for preventing casual or unintended displacement of the lever 79, the pressure of spring 88, however, being such as to permit the plunger 84 automatically to move outwardly under the camming force of the recesses 87 occasioned by a sweeping movement of the hand intended to swing the lever 79, as will be understood. Accordingly, the operator is not required to remove his hand from the hand-wheel 78 in order to shift lever 79, but may engage and shift the lever 79 with an extended finger while turning the hand-wheel 78, thus making for so-called "touch control" and greatly facilitating the work of the operator or technician.

Turning now to the construction of, and provision for adjusting, the back-rest section 3 and leg-rest section 5, best seen in Figures 2, 3, 4, and 16, such sections substantially correspond in structure to the center section 4, in that the sections 3 and 5 also are generally rectangular in plan and have frame structures 89 and 90, respectively, having suitably connected angular side and end members, and it may be here mentioned that the several top sections of the table are preferably constructed of two layers of sheet metal interposed by a layer of a suitable sound-deadening material. Of such sections, the respective bottom layers 91 are preferably formed of steel plates of appropriate thickness to provide for rigidity, and the upper layers 92 are desirably formed of thin sheets of stainless steel or the like and are turned downwardly over the sides and lower margins of the frames, where they are secured for constituting facings for such surfaces. As appears in Figure 16, the side panels 59 of the center section 4 are recessed for accommodating removable facing members 94, which aid, as shown, in securing the turned-under margins of the upper layer 92 of such section.

As best seen in Figure 2, the top-sections 3 and 5 are hingedly connected to the respective opposite margins of the center section 4 by means of pairs of pintle-joined projecting hinge-knuckles 95 and 96, which latter are preferably integrally formed on the frame-portions 89, 90. It may be mentioned that, as also seen in Figure 2, in the case of the foot-rest section 5, short pintles 97 are preferably employed for connecting the hinge knuckles 95, so as not to obstruct the perineal opening 60ª, while a single elongated pintle 98, preferably provided with a covering sleeve 99, joins together the hinge knuckles 96.

The back-rest section 3 is supported and its angular position adjusted relative to the center section 4 in a manner now to be described. Projecting inwardly from the side panel 60, as best seen in Figures 3 and 9, is a pair of suitably spaced bearing-lugs 100 rotarily supporting a shaft 101 projecting downwardly beyond the lower bearing-lug 100. Fixed on the lower end of shaft 101, is a downwardly facing bevel gear 102, and secured between suitable thrust bearings on shaft 101, is a worm 103, which meshes with a worm sector gear 104 secured on a transverse shaft 105, one end of which is journalled in the side panel 60 and the opposite end in the adjacent bearing arm 62.

A crank-arm or link 106 having its inner end fixed to shaft 105 projects forwardly through an opening 107 in end-plate 61 and is connected at its forward end to a link 108 by means of a pivot pin 109, the link 108 at its upper end being pivotally connected by a pin 110 to a bearing cleat 111 secured to the under side of top-section 3. It will now be evident that rotation of worm 103 by its gear 102 will cause shaft 105 to rotate and actuate crank-arm 106, the top section 3 raising or lowering with the forward end of the crank-arm 106. It may be observed that the link 108 and bowed shape of crank-arm 106 permit the latter to clear the hinge pin 98, so that the upper body or back-rest section 3 may be fully raised to a vertical or chair position.

Support and adjustment of the leg section 5 are obtained in much the same manner as described in connection with the section 3. Thus, as best seen in Figures 2 and 3, a worm gear 112 is keyed to a vertical shaft 113 journalled in suitably spaced bearing-plates 114 extending transversely between the side panel 60 and a longitudinal rib 115 of the frame of leg-rest 5. Shaft 113 projects downwardly beyond the lower plate 114 and has an upwardly facing bevel gear 116 fixed upon its lower end. A transverse shaft 117 journalled in the side panel 60 and the rib 115 is driven from the worm 112 by means of a worm sector gear 118, and said shaft 117 is operatively connected to the leg-rest 5 by means of a crank-arm 119, a link 120, pivot pins 121 and 122, and bearing cleat 123, a shield or housing 124 for such worm and gear mechanism preferably depending from the rear margin of the center section 4, as shown.

Selective control and adjustment of the back-rest section 3 and leg section 5 are obtained by means which, as further seen in Figures 2 and 3, include a shaft 125 that extends along the table and a hand-wheel 126 on the forward or head-end thereof, where it is conveniently accessible to the left hand of the operator or technician. Shaft 125 is journalled adjacent its rear end in a bearing-lug 127 and adjacent its forward end in a bearing 128 mounted in the forward end of a shaft housing 129 bolted or otherwise secured to the depending center section frame-plate 61. As in the case of control shaft 73 located at the right-hand side of the table, shaft 125 is adapted for both endwise shifting and rotary movement and has secured thereon a bevel gear 130 arranged to mesh with gear 102 when the shaft 125 is shifted forwardly and a bevel gear 131 arranged to mesh with gear 116 when the shaft 125 is shifted rearwardly.

Also, while not specifically shown, means which are preferably of the same character as those employed for shifting control-shaft 73 are preferably provided for shifting the control-shaft 125, so that unified yet selective touch control of the leg section 5 and back-rest section 3 may be had at the hand-wheel 126.

The head-rest section 2 at the forward end of the back-rest 3 is preferably mounted so as to be both removable and adjustable, and it will be understood that, while not here shown, suitable means may be provided for retaining the head-rest 2 in any of its adjusted positions.

As will be observed, the operating table of my invention is extremely simple of adjustment and control and efficiently accomplishes and achieves in all respects the objects stated, the relative angular adjustments or lateral and longitudinal tilting of the several top-sections being effected with ease and facility by merely the two shafts 73 and 125, both of which having their actuating members located at the head of the table conveniently accessible to the operator or technician, and the meshing gears of such actuating means functioning also for maintaining the table top-sections in such respectively longitudinally or laterally tilted positions.

It will be understood that, while my invention has been described with reference to a preferred embodiment thereof, changes in the form, construction, arrangement, and combination of the several parts of the table may be made and substituted for those herein shown and described wtihout departing from the nature and principle of my invention.

Having thus described my invention, what I claim and desire to secure by Letters Patent is:

1. An operating table including a pedestal, a top-section, means comprising separate worm and gear assemblies for mounting the top-section on the pedestal for longitudinal and lateral tilting, and means comprising a common shaft for actuating either of said gear assemblies for selectively effecting longitudinal or lateral tilting of the top-section.

2. In an operating table, a pedestal, a top-section, means comprising separate worm and gear assemblies for mounting the top-section on the pedestal for longitudinal and lateral tilting, an actuating shaft mounted for shiftable and rotary movement on the table, and means for engaging the shaft with respective gear assemblies for effecting selective longitudinal or lateral tilting of the top-section.

3. In an operating table, a pedestal, a top-section, means comprising separate worm and gear assemblies for mounting the top-section on the pedestal for longitudinal and lateral tilting, an actuating shaft mounted for shiftable and endwise movement on the table, gears on the shaft for respective engagement with said assemblies for effecting selective longitudinal or lateral tilting of the top-section, and control means including a manipulating member pivoted on the shaft for selectively connecting the shaft-gears with said assemblies.

4. In an operating table, a pedestal, a top-section, means comprising a plurality of gear assemblies for mounting the top-section on the pedestal for longitudinal and lateral tilting, and means for actuating the tilting means for selectively effecting longitudinal or lateral tilting of the top-section, said last means comprising a drive shaft mounted for endwise and rotary movement on the top-section, gears on the shaft for respective engagement with said assemblies, a member for rotarily actuating the shaft, and a manipulating member located adjacent the operating member for endwise shifting the shaft.

5. In an adjustable operating table, a pedestal, a top-section, means comprising gear assemblies connected to the top-section and pedestal and an endwise shiftable drive shaft having gears fixed thereon for engagement with respective gear assemblies responsively to shifting movement of the shaft for effecting longitudinal or lateral tilt of the top-section, and means comprising a fixed guide plate disposed obliquely to the shaft and a lever journalled on the shaft having a portion thereof constrained for movement along the margin of said guide plate for shifting said shaft.

6. In an operating table, a pedestal, a top-section, means comprising a coupler pivotally mounted on the pedestal and gear assemblies intermediate the coupler and top-section for mounting the top-section on the pedestal for longitudinal and lateral tilting, and means including a single endwise shiftable and rotary shaft on the table for actuating the tilting means for selectively effecting longitudinal or lateral tilting of the top-section relatively to the pedestal.

7. An operating table including a pedestal, a top-section, means adjustably mounting the top-section on the pedestal for lateral and longitudinal tilting, said means including a coupling member, relatively transversely disposed coupling pins interconnecting said member to said pedestal and top-section, a worm and gear combination for regulating tilting of said coupling member on the pedestal, a second worm and gear combination for regulating tilting of the top-section on said coupling member, parallel drive shafts for said worms extending transversely of the top-section, a single endwise adjustable control shaft carried by and extending longitudinally of the top-section, and means operable in response to endwise adjustment of said control shaft for selectively connecting the same to either of said drive shafts.

HYMAN ROBERT SHAMPAINE.

REFERENCES CITED

The following references are of record in the file of this patent:

UNITED STATES PATENTS

| Number | Name | Date |
| --- | --- | --- |
| 1,571,205 | Laurent | Feb. 2, 1926 |
| 1,267,812 | Smith | May 28, 1918 |
| 1,746,035 | Fitting, Jr. | Feb. 4, 1930 |
| 1,740,906 | Rothanszky et al. | Dec. 24, 1929 |
| 2,092,266 | Talas | Sept. 7, 1937 |
| 1,814,482 | Miller | July 14, 1931 |
| 2,172,941 | Manning | Sept. 12, 1939 |
| 2,217,783 | Bell | Oct. 15, 1940 |

FOREIGN PATENTS

| Number | Country | Date |
| --- | --- | --- |
| 434,100 | French | Nov. 15, 1911 |